United States Patent
Tu et al.

(10) Patent No.: US 10,271,017 B2
(45) Date of Patent: Apr. 23, 2019

(54) SYSTEM AND METHOD FOR GENERATING AN ACTIVITY SUMMARY OF A PERSON

(71) Applicant: General Electric Company, Schenectady, NY (US)

(72) Inventors: Peter Henry Tu, Niskayuna, NY (US); Ting Yu, Niskayuna, NY (US); Dashan Gao, San Diego, CA (US); Yi Yao, Avenel, NJ (US)

(73) Assignee: General Electric Company, Schenectady, NY (US)

( * ) Notice: Subject to any disclaimer, the term of this patent is extended or adjusted under 35 U.S.C. 154(b) by 654 days.

(21) Appl. No.: 13/888,941

(22) Filed: May 7, 2013

(65) Prior Publication Data
US 2014/0071287 A1    Mar. 13, 2014

Related U.S. Application Data

(60) Provisional application No. 61/700,490, filed on Sep. 13, 2012.

(51) Int. Cl.
*H04N 7/00*    (2011.01)
*H04N 7/18*    (2006.01)
(Continued)

(52) U.S. Cl.
CPC ......... *H04N 7/181* (2013.01); *G06K 9/00751* (2013.01); *G06K 9/00771* (2013.01);
(Continued)

(58) Field of Classification Search
CPC ........... G06K 9/00751; G06K 9/00771; H04N 7/181; H04N 21/2187; H04N 21/8549;
(Continued)

(56) References Cited

U.S. PATENT DOCUMENTS

| 5,745,036 A | 4/1998 | Clare |
| 6,404,925 B1 * | 6/2002 | Foote ............... G06F 17/30746 348/480 |

(Continued)

FOREIGN PATENT DOCUMENTS

| CN | 102339380 A | 2/2012 |
| EP | 1742185 A2 | 1/2007 |
| WO | 2007030168 A1 | 3/2007 |

OTHER PUBLICATIONS

"Video Surveillance Technologies for Retail Security (VISITORS)"; National Institute of Standards and Technology (NIST); Downloaded from Internet:<http://www.nist.gov/itl/iad/mig/retailsecurity.cfm> on Feb. 6, 2013; 2 Pages.

(Continued)

*Primary Examiner* — Jefferey F Harold
*Assistant Examiner* — Humam M Satti
(74) *Attorney, Agent, or Firm* — GE Global Patent Operation; John Darling

(57) ABSTRACT

In accordance with one aspect of the present technique, a method includes receiving one or more videos from one or more image capture devices. The method further includes generating a video-loop of the person from the one or more videos. The video-loop depicts the person in the commercial site. The method also includes generating an action clip from the video-loop. The action clip includes a suspicious action performed by the person in the commercial site. The method further includes generating an activity summary of the person including the video-loop and the action clip.

20 Claims, 4 Drawing Sheets

(51) Int. Cl.
*H04N 21/2187* (2011.01)
*H04N 21/8549* (2011.01)
*G06K 9/00* (2006.01)
*G08B 13/196* (2006.01)
*G11B 27/031* (2006.01)
*G11B 27/28* (2006.01)

(52) U.S. Cl.
CPC . *G08B 13/19602* (2013.01); *G08B 13/19613* (2013.01); *G11B 27/031* (2013.01); *G11B 27/28* (2013.01); *H04N 21/2187* (2013.01); *H04N 21/8549* (2013.01)

(58) Field of Classification Search
CPC ........ G08B 13/19602; G08B 13/19613; G11B 27/031; G11B 27/28
USPC ................ 348/143, 144, 150, 152, 153, 159
See application file for complete search history.

(56) References Cited

U.S. PATENT DOCUMENTS

| | | | | |
|---|---|---|---|---|
| 6,665,423 | B1* | 12/2003 | Mehrotra | H04N 19/543 375/E7.087 |
| 6,931,254 | B1 | 8/2005 | Egner et al. | |
| 7,319,479 | B1 | 1/2008 | Crabtree et al. | |
| 7,667,732 | B1* | 2/2010 | Freeman | G06K 9/00711 348/143 |
| 7,930,204 | B1 | 4/2011 | Sharma et al. | |
| 7,944,468 | B2* | 5/2011 | Hoffman | G08B 13/19608 348/143 |
| 8,009,863 | B1* | 8/2011 | Sharma | G06K 9/00335 348/159 |
| 8,089,563 | B2* | 1/2012 | Girgensohn | G06F 17/30811 348/159 |
| 8,098,888 | B1 | 1/2012 | Mummareddy et al. | |
| 8,115,623 | B1 | 2/2012 | Green | |
| 8,170,909 | B2 | 5/2012 | Brown et al. | |
| 8,224,029 | B2 | 7/2012 | Saptharishi et al. | |
| 8,289,390 | B2* | 10/2012 | Aggarwal | G01S 3/7864 348/143 |
| 8,295,543 | B2 | 10/2012 | Tu et al. | |
| 8,355,576 | B2 | 1/2013 | Tu et al. | |
| 8,457,354 | B1* | 6/2013 | Kolar | G06K 9/00677 348/143 |
| 8,958,645 | B2* | 2/2015 | Lu | H04N 5/91 382/182 |
| 9,361,514 | B2* | 6/2016 | Pollard | G06K 9/00442 |
| 9,552,522 | B2* | 1/2017 | Dudovich | G06K 9/00778 |
| 2004/0161133 | A1* | 8/2004 | Elazar | G01S 3/7864 382/115 |
| 2004/0240542 | A1* | 12/2004 | Yeredor | G06K 9/00771 375/240.01 |
| 2005/0102183 | A1 | 5/2005 | Kelliher et al. | |
| 2005/0134685 | A1* | 6/2005 | Egnal | H04N 7/181 348/157 |
| 2006/0078047 | A1* | 4/2006 | Shu | G06F 17/3079 375/240.01 |
| 2006/0239645 | A1* | 10/2006 | Curtner | G06F 17/3079 386/228 |
| 2006/0243798 | A1* | 11/2006 | Kundu | G06Q 20/00 235/383 |
| 2006/0284978 | A1* | 12/2006 | Girgensohn | G06F 17/30811 348/143 |
| 2007/0296813 | A1* | 12/2007 | Hsieh | H04N 7/18 348/143 |
| 2008/0074496 | A1* | 3/2008 | Venetianer | G06K 9/00335 348/150 |
| 2008/0088706 | A1* | 4/2008 | Girgensohn | H04N 5/247 348/207.99 |
| 2008/0100704 | A1* | 5/2008 | Venetianer | G06F 17/3079 348/143 |
| 2008/0204569 | A1* | 8/2008 | Miller | G06F 17/3079 348/222.1 |
| 2008/0252727 | A1* | 10/2008 | Brown | G06F 17/30831 348/143 |
| 2009/0136141 | A1* | 5/2009 | Badawy | G06F 17/30781 382/225 |
| 2009/0141947 | A1* | 6/2009 | Kyyko | G06K 9/00208 382/118 |
| 2010/0026802 | A1* | 2/2010 | Titus | G08B 13/19608 348/143 |
| 2010/0092037 | A1* | 4/2010 | Peleg | G06F 17/3079 382/103 |
| 2010/0111404 | A1* | 5/2010 | Bobbitt | G06K 9/00771 382/159 |
| 2010/0125581 | A1* | 5/2010 | Peleg | G06F 17/30811 707/737 |
| 2010/0157049 | A1 | 6/2010 | Dvir et al. | |
| 2010/0202693 | A1* | 8/2010 | Song | G06K 9/00375 382/190 |
| 2010/0208064 | A1 | 8/2010 | Liu et al. | |
| 2011/0050897 | A1* | 3/2011 | Cobb | G06K 9/00771 348/143 |
| 2011/0071792 | A1* | 3/2011 | Miner | G06K 9/00771 702/182 |
| 2011/0111404 | A1* | 5/2011 | Salonen | A61K 31/00 435/6.11 |
| 2011/0228984 | A1* | 9/2011 | Papke | G06K 9/00771 382/103 |
| 2011/0231419 | A1* | 9/2011 | Papke | G06F 17/30793 707/756 |
| 2011/0280439 | A1 | 11/2011 | Harrison | |
| 2011/0292232 | A1* | 12/2011 | Zhang | G06F 17/30247 348/222.1 |
| 2011/0320463 | A1* | 12/2011 | Yoshio | G06F 17/30256 707/749 |
| 2012/0027371 | A1* | 2/2012 | Hackett | G06F 17/30784 386/223 |
| 2012/0038766 | A1* | 2/2012 | Park | G08B 13/19671 348/143 |
| 2012/0170902 | A1* | 7/2012 | Zhu | H04N 5/76 386/223 |
| 2012/0229629 | A1* | 9/2012 | Blumstein-Koren | G06F 17/3079 348/143 |
| 2013/0155229 | A1* | 6/2013 | Thornton | H04N 7/18 348/143 |
| 2014/0164507 | A1* | 6/2014 | Tesch | H04L 51/10 709/204 |

OTHER PUBLICATIONS

"StopLift Checkout Vision Systems"; Downloaded from Internet:<http://www.stoplift.com/how-it-works/> on Feb. 6, 2013; 3 Pages.
"Features—Every User is a Power User"; Downloaded from Internet:<http://www.agilenceinc.com/features/> on Feb. 7, 2013; 2 Pages.
Dashan Gao et al.; Titled: "Real-Time Video Tracking System"; Pending U.S. Appl. No. 13/456,399, filed Apr. 26, 2012; 37 Pages.
Viola et al., "Robust real-time face detection", International Conference on Computer Vision, vol. 2, 2001, pp. 747.
Laptev, "On Space-Time Interest Points", International Journal of Computer Vision, vol. 64, Issue 2/3, 2005, pp. 107-123.
Dollar et al., "Behavior Recognition via Sparse Spatio-Temporal Features", Proceedings 2nd Joint International Workshop on Visual Surveillance and Performance Evaluation of Tracking and Surveillance, 2005, pp. 65-72.
Krahnstoever et al., "Multi-View Detection and Tracking of Travelers and Luggage in Mass Transit Environments", 9th IEEE International Workshop on Performance Evaluation of Tracking and Surveillance & CVPR, 2006, pp. 67-74.
Tuzel et al., "Human Detection via Classification on Riemannian Manifolds", IEEE Conference on Computer Vision and Pattern Recognition, 2007, 8 Pages.
Liu et al., "What are customers looking at?", IEEE Conference on Advanced Video and Signal Based Surveillance, 2007, pp. 405-410.
Gao, Mahadevan, & Vasconcelos, "On the plausibility of the discriminant center-surround hypothesis for visual saliency", Journal of Vision (2008) 8(7):13, 2008, pp. 1-18.

(56) References Cited

OTHER PUBLICATIONS

Ning et al., "Discriminative Learning of Visual Words for 3D Human Pose Estimation", IEEE Conference on Computer Vision and Pattern Recognition, 2008, 8 Pages.

Paisitkriangkrai et al., "Fast Pedestrian Detection Using a Cascade of Boosted Covariance Features", IEEE Transactions on Circuits and Systems for Video Technology, vol. 18, Issue 8, 2008, pp. 1140-1151.

Trinh et al., "Multimodal Ranking for Non-Compliance Detection in Retail Surveillance", 2012 IEEE Workshop on the Applications of Computer Vision (WACV), 2012, pp. 241-246.

PCT Search Report and Written Opinion dated Apr. 24, 2014 in connection with corresponding PCT Patent Application No. PCT/US2014/010959.

Unofficial English Translation of Chinese Office Action issued in connection with corresponding CN Application No. 201380059250.6 dated May 12, 2017.

European Search Report and Opinion issued in connection with corresponding EP Application No. 13770576.0 dated Jul. 22, 2016.

\* cited by examiner

SYSTEM AND METHOD FOR GENERATING AN ACTIVITY SUMMARY OF A PERSON

CROSS-REFERENCE TO RELATED APPLICATIONS

This application claims the benefit of U.S. Provisional Patent Application No. 61/700,490, filed on Sep. 13, 2012, entitled "Action based video summarization for convenience stores" which is herein incorporated by reference in its entirety.

BACKGROUND

The subject matter disclosed herein generally relates to generating an activity summary of a person. More specifically, the subject matter relates to systems and methods for generating an activity summary including potential suspicious actions performed by a person in a commercial site or setting.

Commercial sites, for example, department stores, convenience stores, grocery stores, manufacturing facilities, hospitals, or the like, face significant losses in revenue due to security issues such as theft.

In an effort to mitigate such theft, some of these commercial sites have implemented automatic tracking systems for detecting thefts. Such automatic tracking systems tend to have numerous deficiencies. For example, due to the subtlety and complexity of the acts of theft, the automatic tracking systems are generally constructed to be very sensitive to events that raise alarms. More often than not, such automatic tracking systems raise false alarms, causing inconveniences to, for example, customers and security personnel of a convenience store. Alternatively, the automated systems may lower the sensitivity and miss a substantial amount of theft activity.

Thus there is a need for an enhanced systems and methods for detecting such thefts.

BRIEF DESCRIPTION

In accordance with one aspect of the present technique, a method is disclosed. The method includes receiving one or more videos from one or more image capture devices. The method further includes generating a video-loop of the person from the one or more videos. The video-loop includes a trip of the person in the commercial site. The method also includes generating an action clip from the video-loop. The action clip includes a suspicious action performed by the person in the commercial site. The method further includes generating an activity summary of the person including the video-loop and the action clip.

In accordance with one aspect of the present systems, a system is disclosed. The system includes a tracking module for receiving one or more videos from one or more image capture devices and generating a video-loop of the person from the one or more videos. The video-loop includes a trip of the person in the commercial site. The system also includes an analysis module for generating an action clip from the video-loop. The action clip includes a suspicious action performed by the person in the commercial site. The system further includes a summary generator for generating an activity summary of the person including the video-loop and the action clip.

In accordance with one aspect of the present technique, a computer program product encoding instructions is disclosed. The instructions when executed by a processor, causes the processor to receive one or more videos from one or more image capture devices. The instructions further cause the processor to generate a video-loop of the person from the one or more videos. The video-loop includes a trip of the person in the commercial site. The instructions further cause the processor to generate an action clip from the video-loop. The action clip includes a suspicious action performed by the person in the commercial site. The instruction also causes the processor to generate an activity summary of the person including the video-loop and the action clip.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

In the following specification and the claims, reference will be made to a number of terms, which shall be defined to have the following meanings.

The singular forms "a", "an", and "the" include plural references unless the context clearly dictates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Figure 1:
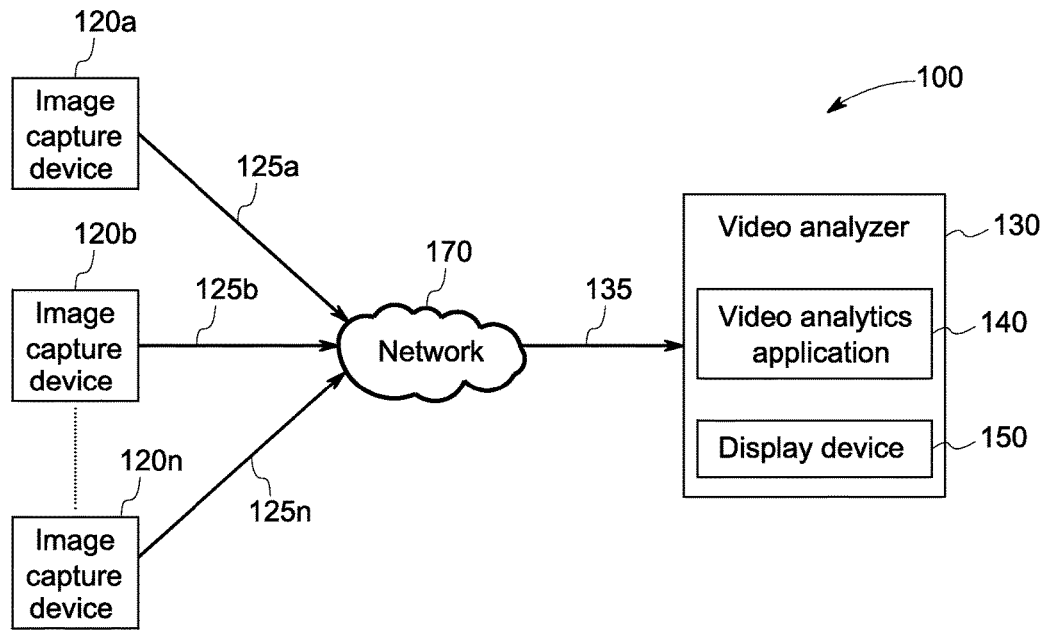
FIG. 1 is a block diagram illustrating a system for generating an activity summary according to one embodiment.

A system and method for generating an activity summary of a person is described herein. FIG. 1 illustrates a block diagram of a system 100 for generating an activity summary of a person according to one embodiment. The illustrated system 100 includes a plurality of image capture devices 120a, 120b, 120n (referred to individually or collectively as image capture devices 120) and a video analyzer 130 that are communicatively coupled via a network 170.

The plurality of image capture devices 120 are type of devices that are configured to record videos, for example, camera, digital video recorder, camcorder, closed-circuit television, webcam, and the like. In one embodiment, at least one of the image capture devices 120 are further configured to measure depth data, representative of the geometrical distances between a point in the physical world and the image capture devices 120. In one embodiment, the image capture devices 120 are installed in a commercial site, for example, department store, grocery store, convenience store, health clinic, salon, airport, manufacturing factory, and the like and are configured to record videos of scenes within the commercial site.

According to one embodiment the image capture devices 120 transmit the recorded videos and the depth data to the video analyzer 130 via the network 170. The image capture devices 120a, 120b, and 120n are communicatively coupled to the network 170 via signal lines 125a, 125b, and 125n respectively. Although in the illustrated embodiment, a plurality of image capture devices 120 are shown, in other embodiments a single image capture device may be coupled to the network 170.

The video analyzer 130 is any type of device configured for analyzing the videos received from the image capture devices 120 and generating an activity summary. In one embodiment, the video analyzer 130 receives one or more videos of a commercial site including features such as the depth data and generates an activity summary of one or more persons in the commercial site. In the illustrated system 100, the video analyzer 130 includes a video analytics application 140 and a display device 150. The video analyzer 130 is communicatively coupled to the network 170 via signal line 135. Although in the illustrated embodiment, one video analyzer 130 is shown, in other embodiments, a plurality of video analyzers 130 may be coupled to the network 170. The video analyzer 130 is described below in more detail with reference to FIG. 2.

In the depicted embodiment a display device 150 is employed to show the video images and/or activity summary. While this embodiment shows a display device 150, other embodiments for the post processed data include other types of alerts are within the scope of the present system. In addition, the display device 150 does not have to be coupled to the video analyzer 130 and the video images and activity summary can be transmitted to a remote display device 150.

While the depicted embodiment depicts the image capture devices 120 communicatively coupled via a network 170, in one embodiment the video analyzer 130 is coupled to the image capture devices 120 such that the processing is performed within the image capture device.

The network 170 may be a wired or wireless type, and may have any number of configurations such as a star configuration, token ring configuration, or other known configurations. Furthermore, the network 170 may include a local area network (LAN), a wide area network (WAN) (e.g., the Internet), and/or any other interconnected data path across which multiple devices may communicate. In one embodiment, the network 170 may be a peer-to-peer network. The network 170 may also be coupled to or include portions of a telecommunication network for sending data in a variety of different communication protocols. In another embodiment, the network 170 includes Bluetooth communication networks or a cellular communications network for sending and receiving data such as via a short messaging service (SMS), a multimedia messaging service (MMS), a hypertext transfer protocol (HTTP), a direct data connection, WAP, email, or the like. While only one network 170 is coupled to the image capture devices 120 and the video analyzer 130, other types of networks 170 may be deployed. Multiple networks can provide redundancy and can be optimally configured according to the design criteria.

Figure 2:
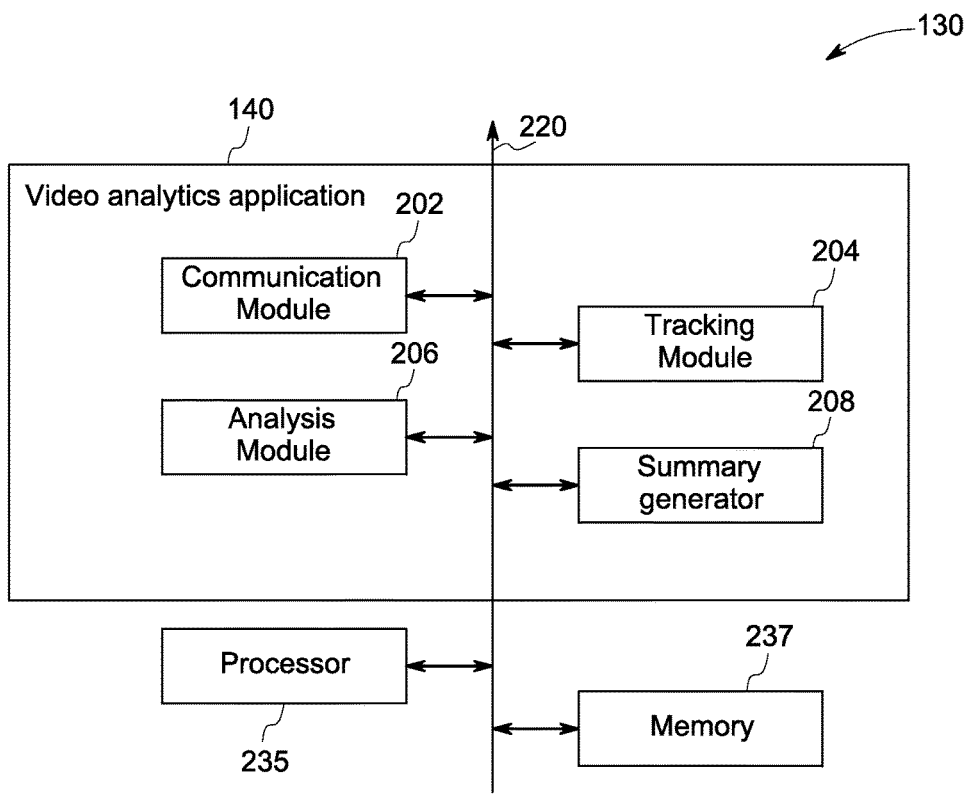
FIG. 2 is a block diagram illustrating a video analyzer according to one embodiment.

FIG. 2 is a block diagram illustrating the video analyzer 130 according to one embodiment. The video analyzer 130 includes the video analytics application 140, at least one processor 235, and memory 237. The video analytics application 140 includes a communication module 202, a tracking module 204, an analysis module 206, and a summary generator 208. The modules of the video analytics application 140, the processor 235, and the memory 237 are coupled to the bus 220 for communication with one another.

The processor 235 may include at least one arithmetic logic unit, microprocessor, general purpose controller or other processor arrays to perform computations, and/or retrieve data stored on the memory 237. In another embodiment, the processor 235 is a multiple core processor. The processor 235 processes data signals and may include various computing architectures including a complex instruction set computer (CISC) architecture, a reduced instruction set computer (RISC) architecture, or an architecture implementing a combination of instruction sets. The processing capability of the processor 235 may be limited to supporting the retrieval of data and transmission of data. The processing capability of the processor 235 may also perform more complex tasks, including various types of feature extraction, modulating, encoding, multiplexing, or the like. In other embodiments, other type of processors, operating systems, and physical configurations are also envisioned.

The memory 237 may be a non-transitory storage medium. For example, the memory 237 may be a dynamic random access memory (DRAM) device, a static random access memory (SRAM) device, flash memory or other memory devices. In one embodiment, the memory 237 also includes a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or other non-volatile storage devices.

The memory 237 stores data that is required for the video analytics application 140 to perform associated functions. In one embodiment, the memory 237 stores the modules (for example, the communication module 202, the summary generator 208, or the like) of the video analytics application 140. In another embodiment, the memory 237 stores one or more videos received from the image capture devices, a suspicion threshold value and a time threshold value defined, for example, by an administrator of the video analyzer 130, metadata associated with a person, or the like. The threshold values and the metadata associated with the person are described in further detail below.

The communication module 202 includes codes and routines for handling communication between the image capture devices and the modules of the video analyzer 130. In one embodiment, the communication module 202 includes a set of instructions executable by the processor 235 to provide the functionality for handling communication between the image capture devices 120 and the modules of the video analyzer 130. In another embodiment, the communication module 202 is stored in the memory 237 and is accessible and executable by the processor 235. In either embodiment, the communication module 202 is adapted for communication and cooperation with the processor 235 and other modules of the video analytics application 140 via the bus 220.

In one embodiment, the communication module 202 receives videos from the image capture devices 120 and sends the videos to the tracking module 204. In another embodiment, the communication module 202 receives graphical data for displaying a user interface including an activity summary from the summary generator 208. In such an embodiment, the communication module 202 transmits the graphical data to the display device 150 (shown in FIG. 1). As used herein, "images" refers to one or more frames of a video.

The tracking module 204 includes codes and routines for detecting and tracking a person from the videos and generating a video-loop of the person. The video-loop displays, for example, images of a trip of a person in a commercial site. In such an example, the trip of the person includes the activities performed by the person from the entry of the person into the commercial site until the exit of the person from the commercial site. In one embodiment, the tracking module 204 includes a set of instructions executable by the processor 235 to provide the functionality for detecting and tracking a person from videos and generating a video-loop of the person. In another embodiment, the tracking module 204 is stored in the memory 237 and is accessible and executable by the processor 235. In either embodiment, the tracking module 204 is adapted for communication and cooperation with the processor 235 and other modules of the video analytics application 140 via the bus 220.

In one embodiment, the tracking module 204 receives a video and the associated depth data from an image capture device installed in a commercial site via the communication module 202. The tracking module 204 nominates foreground regions of interest in the video that may correspond to a person by performing, for example, non-parametric kernel density estimation on the received depth data. The tracking module 204 detects a person in the video by analyzing the nominated regions of interest using geometrical shapes (e.g., a three dimensional ellipsoid, or the like) that resemble the size and shape of a person. The tracking module 204 then extracts a set of images (i.e., frames) from the video that include the detected person and generates the video-loop. Additionally, the tracking module 204 determines metadata associated with the person from the video. The metadata in one example includes features such as location data (e.g., x-y coordinates) of the identified person within the commercial site and an appearance descriptor that represents the spatial distribution of color corresponding to the identified person.

In another embodiment, the tracking module 204 receives a plurality of videos and the associated depth data from a plurality of image capture devices installed in the commercial site. In this embodiment, the image capture devices are pre-calibrated so that the videos from each image capture device are recorded on a common coordinate system. In another embodiment, the tracking module 204 converts each of the received videos into a common coordinate system. The tracking module 204 then detects the person from the plurality of videos and determines metadata as described herein. For example, the tracking module 204 extracts a first set of images and a second set of images including a person from a first video and a second video respectively. In such an example, the first video and the second video are received from a first image capture device 120a (shown in FIG. 1) and a second image capture device 120b (shown in FIG. 1) respectively. The tracking module 204 then generates a video-loop of the person by combining the first and the second set of images based on the similarity of the metadata associated with the person. The generated video-loop includes the entire trip, displaying all activities performed by the person within the commercial site. The tracking module 204 sends the video-loop of the person to the analysis module 206.

The analysis module 206 includes codes and routines for determining a suspicious action performed by a person and generating an action clip from the video-loop. The action clip is a portion of the video-loop that includes the suspicious action performed by the person. In one embodiment, the analysis module 206 includes a set of instructions executable by the processor 235 to provide the functionality for determining a suspicious action performed by the person and generating an action clip from the video-loop. In another embodiment, the analysis module 206 is stored in the memory 237 and is accessible and executable by the processor 235. In either embodiment, the analysis module 206 is adapted for communication and cooperation with the processor 235 and other modules of the video analytics application 140 via the bus 220.

The analysis module 206 analyzes the video-loop of a person received from the tracking module 204 to determine a suspicious action performed by a person. Typically, a suspicious action is any action that indicates the intent or the act of theft by the person. The suspicious action includes, for example, a furtive glance by the person, the person grasping an object (e.g., a product or merchandise in a convenience store), the person removing a component from the object, a person hiding the object, and the like.

In one embodiment, the analysis module 206 determines a suspicious action by analyzing each image (i.e., frame(s)) of the video-loop using image analysis. In this embodiment, the analysis module 206 analyzes the images of the video-loop to determine, for example, facial reaction of the person, pose of the person indicating whether the person is grasping an object, type or cost of the object, and the like. In one embodiment, the analysis module 206 includes a grasping classifier constructed based on, for example, an Adaboost algorithm, to determine whether the person is grasping an object. The analysis module 206 then assigns an image analysis score for the images based on the analysis.

For example, if an image of the video-loop depicts a person grasping an object in a convenience store, the analysis module 206 assigns an image analysis score for the image as 65. In the above example, if the image depicts the person grasping a plastic bag, the analysis module 206 assigns an image analysis score for the corresponding image as 60. Whereas, if the image depicts the person grasping the most expensive object in the convenience store, the analysis module 206 assigns the image analysis score as 75. In the above example, if the image depicts the person covering his face with his other hand or by wearing a hoodie, the analysis module 206 assigns the image analysis score as 85.

The analysis module 206 then identifies one or more suspicious images of the video-loop based on the assigned image analysis scores. In one embodiment, the analysis module 206 determines the image with the highest image analysis score as the suspicious image. In another embodiment, the analysis module 206 determines whether the image analysis scores exceed a suspicion threshold value defined, for example, by an administrator of the video analyzer 130. The analysis module 206 identifies the one or more images with exceeding image analysis scores as the suspicious images. Once the suspicious images are identified, the analysis module 206 generates an action clip from the video-loop for each identified suspicious image. In one embodiment, the action clip generated by the analysis module 206 begins with the corresponding suspicious image. In another embodiment, the action clip includes the corresponding suspicious image. In either embodiment, the duration of the action clip is within the time threshold value (e.g., 2 seconds, 45 seconds, etc.). The analysis module 206 then sends the action clips to the summary generator 208.

In another embodiment, the analysis module 206 determines a suspicious action by analyzing one or more sequences of images (i.e., one or more video clips) from the video-loop using action analysis. In this embodiment, the analysis module 206 identifies one or more spatiotemporal interest points from the video-loop based on, for example, two-dimensional Gaussian smoothing and temporal Gabor filtering. The analysis module 206 analyzes the sequences of images represented by the spatiotemporal interest points to determine shape features and motion features associated with the person. The shape features represent, for example, body parts of the person, objects, or the like. The analysis module 206 determines the shape features by, for example, computing histograms of local image intensity orientations from the sequence of images. The motion features represent, for example, the direction and the speed of motion of the person's hand in the sequence of images. The analysis module 206 determines the motion features by, for example, processing the sequences of images using three-dimensional Gabor filters. In such an example, each of the three-dimensional Gabor filters is tuned to a specific direction and speed.

The analysis module 206 identifies a suspicious sequence of images including the suspicious action performed by a person based on the shape and/or motion features. For example, the analysis module 206 identifies a sequence of images that displays a person looking towards a security officer and then grasping an object as the suspicious sequence of images. In another example, the analysis module 206 identifies a sequence of images that displays a person removing a bar-code from the object as a suspicious sequence of images. In one embodiment, the analysis module 206 constructs a space-time cube including the shape and motion features and identifies the suspicious sequence using a grasping action classifier based on Fisher's linear discriminant algorithm. The analysis module 206 then generates an action clip from the video-loop that includes the identified suspicious sequence of images. The duration of the generated action clip is within the time threshold value. Although the action analysis method is described herein with reference to identifying one suspicious sequence of images, in one embodiment, the analysis module 206 identifies a plurality of suspicious sequences of images and generates an action clip for each suspicious sequence. The analysis module 206 sends the action clips to the summary generator 208.

Although the analysis module 206 is described herein as generating an action clip from the video-loop according to some embodiments, in other embodiments, the analysis module 206 generates the action clip from the one or more videos received from the one or more image capture devices. In such embodiments, the analysis module 206 directly receives a video from an image capture device via the communication module 202. The analysis module 206 determines suspicious actions performed by a person from the video using at least one of image analysis and action analysis. For example, the analysis module 206 receives a video from a camera placed on a shelf in a convenience store. The analysis module 206 determines a suspicious action performed by a person and generates the action clip from the video. This action clip may be associated to the video-loop of the person generated by the tracking module 204 using the common-coordinate system. This is advantageous as the video received directly from the camera may provide higher spatial resolution to determine, for example, a facial reaction of the person.

The summary generator 208 includes codes and routines for generating an activity summary of a person. In one embodiment, the summary generator 208 includes a set of instructions executable by the processor 235 to provide the functionality for generating an activity summary of a person. In another embodiment, the summary generator 208 is stored in the memory 237 and is accessible and executable by the processor 235. In either embodiment, the summary generator 208 is adapted for communication and cooperation with the processor 235 and other modules of the video analytics application 140 via the bus 220.

The summary generator 208 receives a video-loop of a person from the tracking module 204. The summary generator 208 also receives one or more action clips of the person from the analysis module 206. The summary generator 208 then generates graphical data for providing a user interface (i.e., the activity summary) that includes the video-loop and the one or more action clips of the person. In one embodiment, the summary generator 208 generates the graphical data based on the location data (e.g., x-y coordinates) associated with the person. In such an embodiment, the summary generator 208 determines the location of the person within the commercial site in each action clip and generates the graphical data based on the location of the person. For example, the summary generator 208 determines that the location of the person in the received action clip is on the left most aisle within the convenience store. In such an example, the summary generator 208 generates graphical data to present the action clip to the left of the video-loop. The user interface is described below in further detail with reference to FIG. 3.

The summary generator 208 sends the graphical data to the display device. The display device renders the graphical data to display the activity summary. In one embodiment, the summary generator 208 determines whether the person is approaching an exit of the commercial site based on the location data associated with the person. In such an embodiment, the summary generator 208 transmits the graphical data to the display device in response to (i.e., contemporaneously) determining that the person is approaching the exit of the commercial site. The activity summary is advantageous as it simultaneously displays the video-loop showing the entire trip of, for example, a customer in a convenience store and one or more action clips showing suspicious actions performed by the customer. An administrator of the video analyzer 140, for example, security personnel of the convenience store, can quickly review (prior to the customer leaving the convenience store) the action clips and determine whether the customer has stolen a product. Thus, the issue of raising false alarms is reduced.

Figure 3:
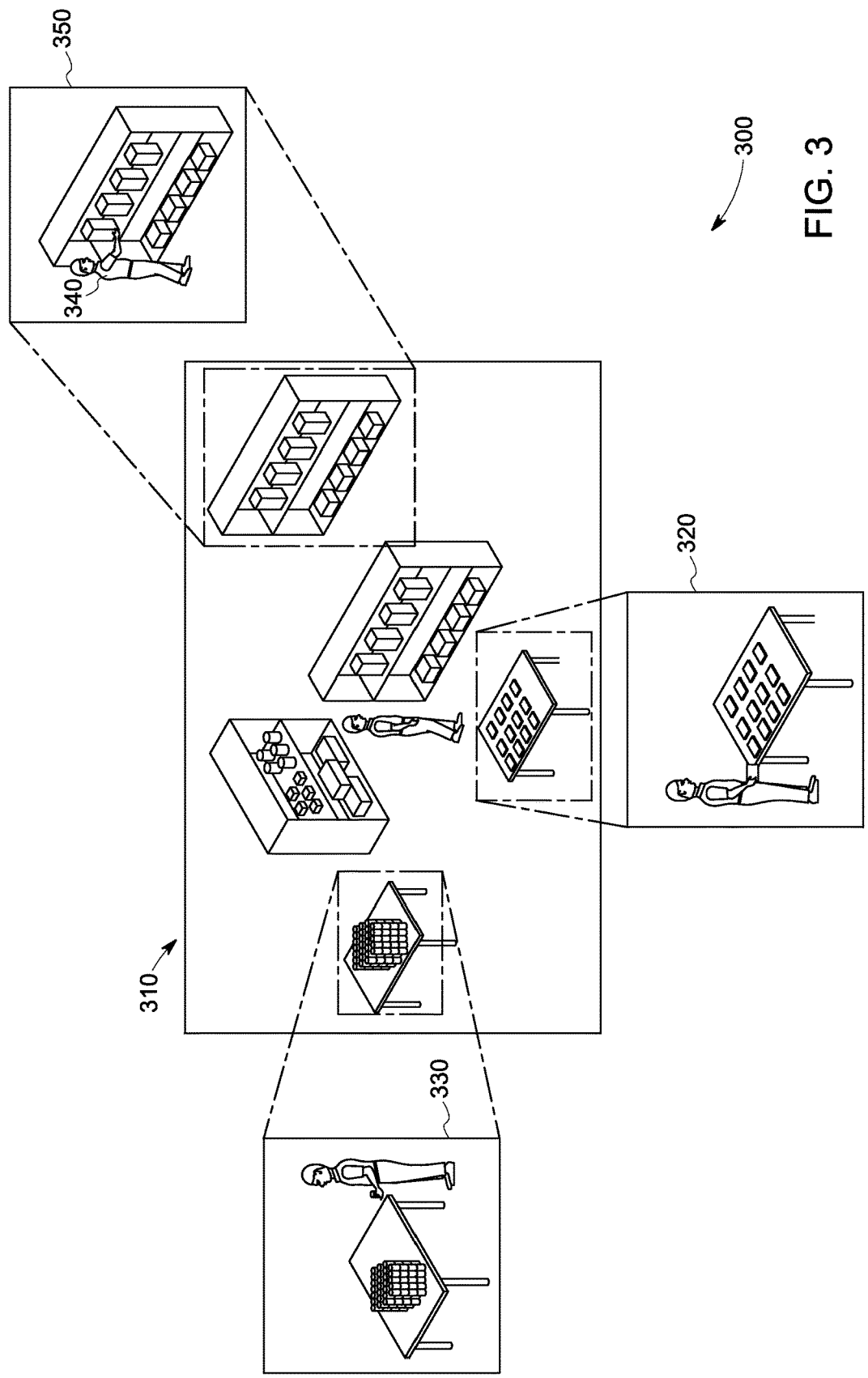
FIG. 3 is a diagrammatical representation of a user interface including an activity summary of a person in a commercial site according to one embodiment.

FIG. 3 is a user interface 300 including an activity summary of a person according to one embodiment. The illustrated embodiment includes a video-loop 310 displaying images of the entire trip of the person inside a convenience store. The illustrated embodiment further includes action clips 320, 330, and 350 displaying suspicious actions (i.e., grasping an object) performed by a person 340. For example, the action clip 350 displays the person 340 reaching out and grasping a product from a shelf in the convenience store. In this embodiment, the summary generator generates the activity summary based on the location of the person 340 within the convenience store in each of the action clips 320, 330, and 350. For example, the summary generator determines that the person 340 is located on the left hand side of the convenience store in the action clip 330. Thus, the summary generator presents the action clip 330 to the right of the video-clip 310 in the user interface 300.

Figure 4:
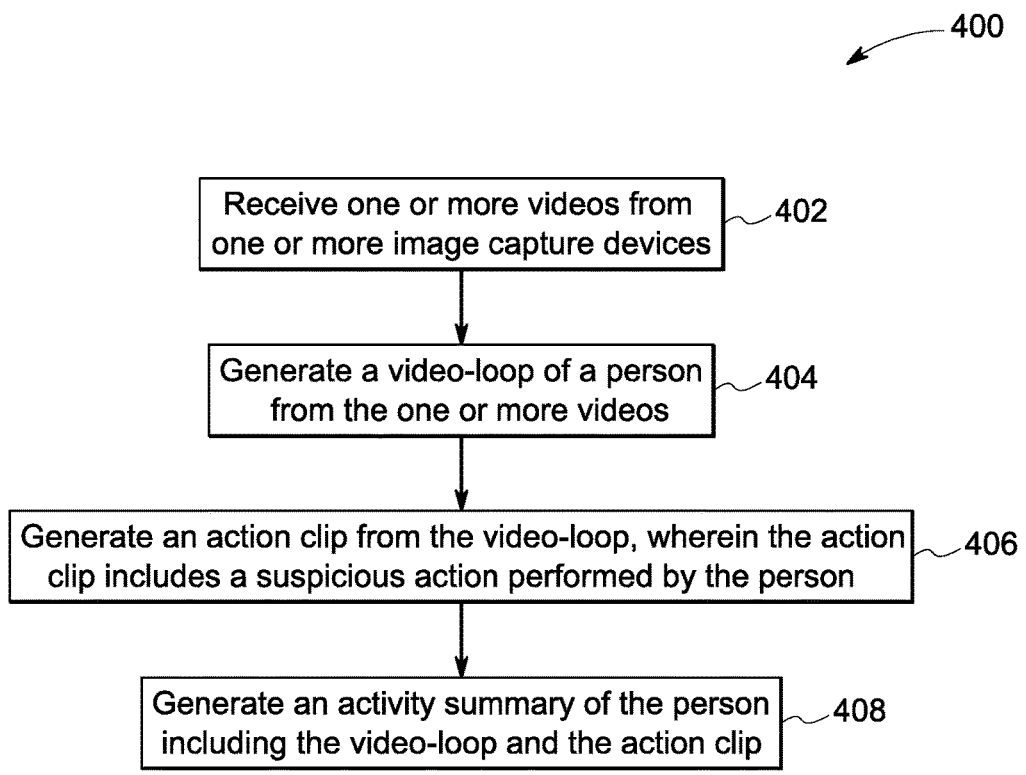
FIG. 4 is a flow diagram illustrating a method for generating an activity summary of a person in a commercial site according to one embodiment.

FIG. 4 is a flow diagram illustrating an exemplary method 400 for generating an activity summary of a person in a commercial site. The communication module receives 402 one or more videos from one or more image capture devices. The tracking module generates 404 a video-loop of a person from the one or more videos. The analysis module generates 406 an action clip from the video-loop. The action clip includes a suspicious action performed by the person. For example, the analysis module 406 generates an action clip including the person grasping an object using image analysis. The summary generator then generates 408 an activity summary of the person including the video-loop and the action clip.

Figure 5:
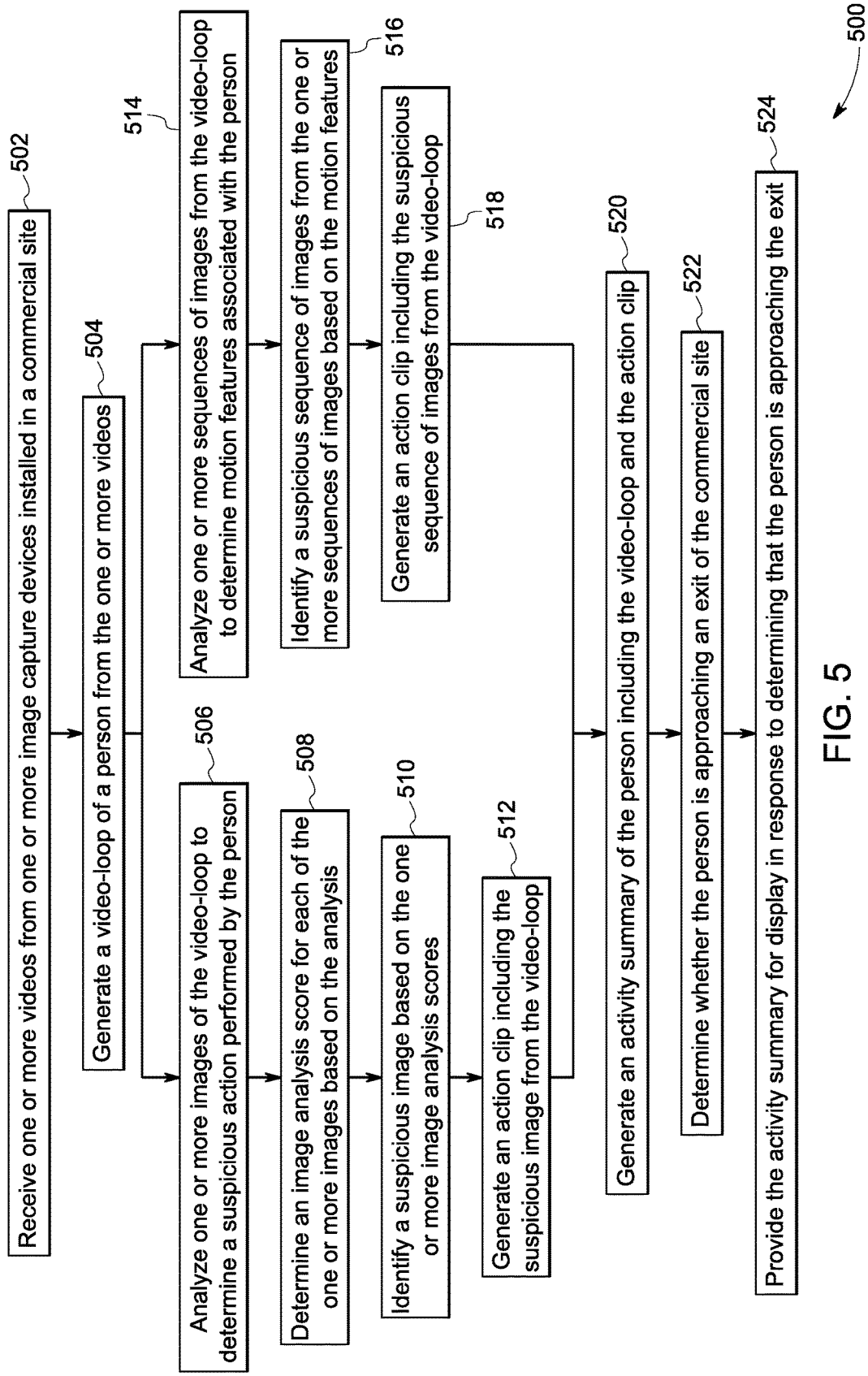
FIG. 5 is a flow diagram illustrating a method for generating an activity summary of a person in a commercial site according to another embodiment.

FIG. 5 is a flow diagram illustrating another exemplary method 500 for generating an activity summary of a person in a commercial site. The communication module receives 502 one or more videos from one or more image capture devices installed in a commercial site. The tracking module generates 504 a video-loop of a person from the one or more videos.

In one embodiment, the analysis module analyzes 506 one or more images of the video-loop to determine a suspicious action performed by the person. The analysis module determines 508 an image analysis score for each of the one or more images based on the analysis. The analysis module then identifies 510 a suspicious image based on the one or more image analysis scores. For example, the analysis module identifies the image with the highest image analysis score as the suspicious image. The analysis module generates 512 an action clip including the suspicious image from the video-loop. For example, the analysis module generates an action clip from the video-loop which begins with the suspicious image.

In another embodiment, the analysis module analyzes 514 one or more sequences of images from the video-loop to determine motion features associated with the person. The analysis module identifies 516 a suspicious sequence of images from the one or more sequences of images based on the motion features. The analysis module then generates 518 an action clip including the suspicious sequence of images from the video-loop. In either embodiment, the summary generator generates 520 an activity summary of the person including the video-loop and the action clip. The summary generator then determines 522 whether the person is approaching an exit of the commercial site. The summary generator provides 524 the activity summary for display in response to determining that the person is approaching the exit.

A technical effect of the present embodiment comprises receiving one or more videos from one or more image capture devices, generating a video-loop of the person from the one or more videos, wherein the video-loop shows the person in the commercial site. The method also includes generating an action clip from the video-loop where the action clip includes a suspicious action performed by the person in the commercial site and generating an activity summary of the person including the video-loop and the action clip.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims. What is claimed as new and desired to be protected by Letters Patent of the United States is:

What is claimed as new and desired to be protected by Letters Patent of the United States is:

1. A method for generating an activity summary of a person in a commercial site, the method comprising:
   receiving one or more videos from one or more image capture devices;
   determining metadata associated with the person from the one or more videos, the metadata including location data of the person and an appearance descriptor that represents a spatial distribution of color corresponding to the person;
   generating a video-loop of the person from the one or more videos by combining sets of images from the one or more videos based on a similarity of the metadata associated with the person, wherein the video-loop includes images of an entire trip, including all activities, of the person in the commercial site;

generating at least one action clip from the video-loop, wherein the at least one action clip includes a suspicious action performed by the person in the commercial site; and generating the activity summary of the person including the video-loop and the at least one action clip.

2. The method of claim 1, wherein the suspicious action includes at least one of grasping an object, removing a component from the object and hiding the object.

3. The method of claim 1, wherein generating the at least one action clip further comprises:

analyzing one or more images of the video-loop to determine the suspicious action performed by the person;

determining an image analysis score for each of the one or more images based on the analysis of the one or more images;

identifying a suspicious image from the one or more images based on the one or more image analysis scores; and generating the at least one action clip including the identified suspicious image from the video-loop.

4. The method of claim 3, wherein the at least one action clip begins with the identified suspicious image.

5. The method of claim 1, wherein generating the action dip further comprises:

analyzing one or more sequences of images from the video-loop to determine one or more motion features associated with the person;

identifying a suspicious sequence of images from the one or more sequences of images based on the one or more motion features; and generating the at least one action clip including the suspicious sequence of images from the video-loop.

6. The method of claim 1, wherein generating the video-loop of the person further comprises:

receiving a first video of the one or more videos from a first image capture device of the one or more image capturing devices identifying a first set of images including the person from the first video;

receiving a second video of the one or more videos from a second image capture device of the one or more image capturing devices;

identifying a second set of images including the person from the second video; and generating the video-loop of the person by combining the first set of images and the second set of images.

7. The method of claim 1, further comprising:

determining whether the person is approaching an exit of the commercial site; and sending the activity summary for display in response to determining that the person is approaching the exit of the commercial site.

8. A system for generating an activity summary of a person in a commercial site, the system comprising:

at least one processor;

a tracking module stored in a memory and, executable by the at least one processor, the tracking module for receiving one or more videos from one or more image capture devices, determining metadata associated with the person from the one or more videos, the metadata including location data of the person and an appearance descriptor that represents a spatial distribution of color corresponding to the person, and generating a video-loop of the person from the one or more videos by combining sets of images from the one or more videos based on a similarity of the metadata associated with the person, wherein the video-loop includes images of an entire trip, including all activities, of the person in the commercial site;

an analysis module stored in the memory and executable by the at least one processor, the analysis module communicatively coupled to the tracking module for generating at least one action clip from the video-loop, wherein the at least one action clip includes a suspicious action performed by the person in the commercial site; and a summary generator stored in the memory and executable by the at least one processor, the summary generator communicatively coupled to the analysis module for generating the activity summary of the person including the video-loop and the at least one action clip.

9. The system of claim 8, wherein the analysis module is further configured to:

analyze one or more images of the video-loop to determine the suspcious action performed by the person;

determine an image analysis score for each of the one or more images based on the analysis of the one or more images;

identify a suspicious image from the one or more images based on the one or more image analysis scores; and generate the at least one action clip including the identified suspicious image from the video-loop.

10. The system of claim 8, wherein the analysis module is further configured to:

analyze one or more sequences of images from the video-loop to determine one or more motion features associated with the person;

identify a suspicious sequence of images from the one or more sequences of images based on the one or more motion features; and generate the at least one action clip including the suspicious sequence of images from the video-loop.

11. The system of claim 8, wherein the tracking module is further configured to:

receive a first video of the one or more videos from a first image capture device of the one or more image capturing devices;

identify a first set of images including the person from the first video;

receive a second video of the one or more videos from a second image capture device of the one or more image capturing devices;

identify a second set of images including the person from the second video; and generate the video-loop of the person by combining the first set of images and the second set of images.

12. The system of claim 8, wherein the summary generator is further configured to determine whether the person is approaching an exit of the commercial site and send the activity summary for display in response to determining that the person is approaching the exit of the commercial site.

13. A computer program product comprising a non-transitory computer readable medium encoding instructions that, in response to execution by at least one processor, cause the processor to perform operations comprising:

receiving one or more videos from one or more image capture devices;

determining metadata associated with the person from the one or more videos, the metadata including location data of the person and an appearance descriptor that represents a spatial distribution of color corresponding to the person;

generating a video-loop of a person from the one or more videos by combining sets of images from the one or more videos based on a similarity of the metadata associated with the person, wherein the video-loop includes images of an entire trip, including all activities, of the person in a commercial site;

generating at least one action clip from the video-loop, wherein the at least one action clip includes a suspicious action performed by the person in the commercial site; and generating an activity summary of the person including the video-loop and the at least one action clip.

14. The computer program product of claim 13, further causing the processor to perform operations comprising:

analyzing one or more images of the video-loop to determine the suspcious action performed by the person;

determining an image analysis score for each of the one or more images based on the analysis of the one or more images;

identifying a suspicious image from the one or more images based on the one or more image analysis scores; and generating the action dip including the identified suspicious image from the video-loop.

15. The computer program product of claim 14, wherein the at least one action clip begins with the suspicious image.

16. The computer program product of claim 13, further causing the processor to perform operations comprising:

analyzing one or more sequence of images from the video-loop to determine one or amore motion features associated with the person;

identifying a suspicious sequence of images from the one or more sequence of images based on the one or more motion features; and generating the at least one action clip including the suspicious sequence of images from the video-loop.

17. The computer program product of claim 13, further causing the processor to perform operations comprising:

determining whether the person is approaching an exit of the commercial site; and sending the activity summary for display in response to determining that the person is approaching the exit of the commercial site.

18. The method of claim 1, further comprising:

identifying one or more spatiotemporal interest points from the video-loop based on two-dimensional Gaussian smoothing and temporal Gabor filtering.

19. The method of claim 18, further comprising:

analyzing a sequence of images represented by the one or more spatiotemporal interest points to determine shape features and motion features associated with the person.

20. The method of claim 19, wherein a grasping action is determined as motion feature through an Adaboost algorithm or Fisher's linear discriminant algorithm.

* * * * *